(12) United States Patent
Rutkowski

(10) Patent No.: US 12,075,756 B1
(45) Date of Patent: Sep. 3, 2024

(54) PET LEG PROTECTOR SLEEVE

(71) Applicant: Vilany Antunes Rutkowski, Dade City, FL (US)

(72) Inventor: Vilany Antunes Rutkowski, Dade City, FL (US)

( * ) Notice: Subject to any disclaimer, the term of this patent is extended or adjusted under 35 U.S.C. 154(b) by 237 days.

(21) Appl. No.: 17/687,619

(22) Filed: Mar. 5, 2022

(51) Int. Cl.
*A01K 13/00* (2006.01)

(52) U.S. Cl.
CPC .................. *A01K 13/007* (2013.01)

(58) Field of Classification Search
CPC .. A01K 13/007; A01K 13/008; A01K 13/006; A01K 13/00; A61D 9/00
See application file for complete search history.

(56) References Cited

U.S. PATENT DOCUMENTS

| | | | | |
|---|---|---|---|---|
| 295,712 | A | * 3/1884 | Anderson | A01K 13/007 54/82 |
| 2,443,831 | A | * 6/1948 | Miller | A01K 13/006 36/111 |
| 4,744,333 | A | 5/1988 | Taylor | |
| 10,015,950 | B1 | 7/2018 | White | |
| 2009/0255027 | A1 | 10/2009 | Laitmon | |
| 2010/0043724 | A1* | 2/2010 | Sherer | A01K 13/006 54/79.2 |
| 2012/0247399 | A1* | 10/2012 | Rivera-Brutto | A61D 9/00 119/850 |
| 2017/0112096 | A1* | 4/2017 | Graves | A01K 29/00 |
| 2019/0343075 | A1* | 11/2019 | Thiem | A61D 9/00 |

FOREIGN PATENT DOCUMENTS

| | | | | |
|---|---|---|---|---|
| CH | 673940 A | * | 4/1990 | ............ A61D 9/00 |
| CH | 673940 A5 | * | 4/1990 | |
| DE | 202009011552 U1 | * | 6/2010 | ............ A61D 9/00 |
| DE | 202012009382 U1 | * | 4/2013 | ............ A61D 9/00 |
| DE | 202013004224 U1 | * | 9/2014 | ............ A61D 9/00 |
| DE | 202015006047 U1 | * | 12/2015 | ............ A61D 9/00 |
| DE | 102014012435 A1 | * | 2/2016 | ............ A61D 9/00 |
| DE | 202015008565 U1 | * | 3/2016 | ............ A61D 9/00 |
| DE | 102019118063 A1 | * | 1/2020 | |
| FR | 2924329 A1 | * | 6/2009 | ............ A61D 9/00 |
| JP | 2008043369 A | * | 2/2008 | |
| JP | 2017060425 A | * | 3/2017 | |
| WO | WO-2015088456 A1 | * | 6/2015 | ............ A61D 9/00 |

OTHER PUBLICATIONS

DE 202012009382 U1 Machine translation (Year: 2013).*
DE 202009011552 U1 Machine translation (Year: 2010).*

* cited by examiner

*Primary Examiner* — Son T Nguyen
(74) *Attorney, Agent, or Firm* — Edward P Dutkiewicz

(57) ABSTRACT

The sleeve comprises a hollow tubular lower portion. The hollow tubular lower portion has a taper running from a lower extent of the hollow tubular lower portion to a chest wrap portion of the pet leg protector sleeve. The chest wrap portion having a top having a pass through, with the pass through comprising a pair of loops, being a forward loop and rearward loop. There is a median component. There is a forward strap and a rearward strap which each has a co-acting removable attachment means located on a distal end outer surface of each strap.

1 Claim, 4 Drawing Sheets

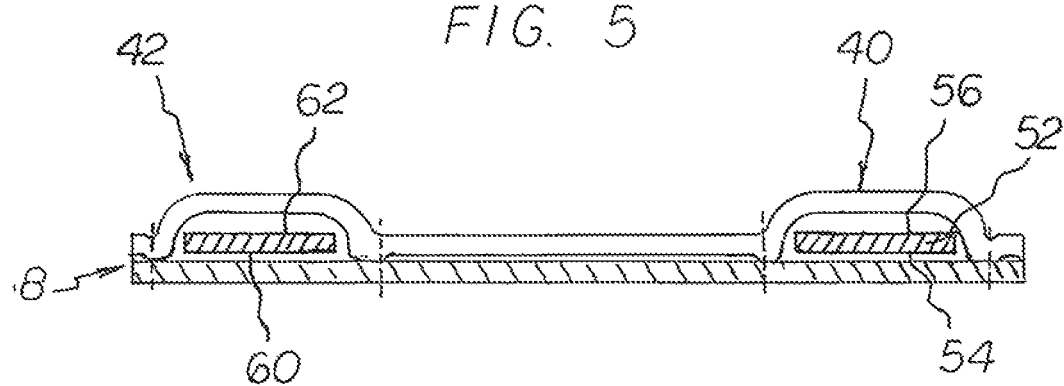
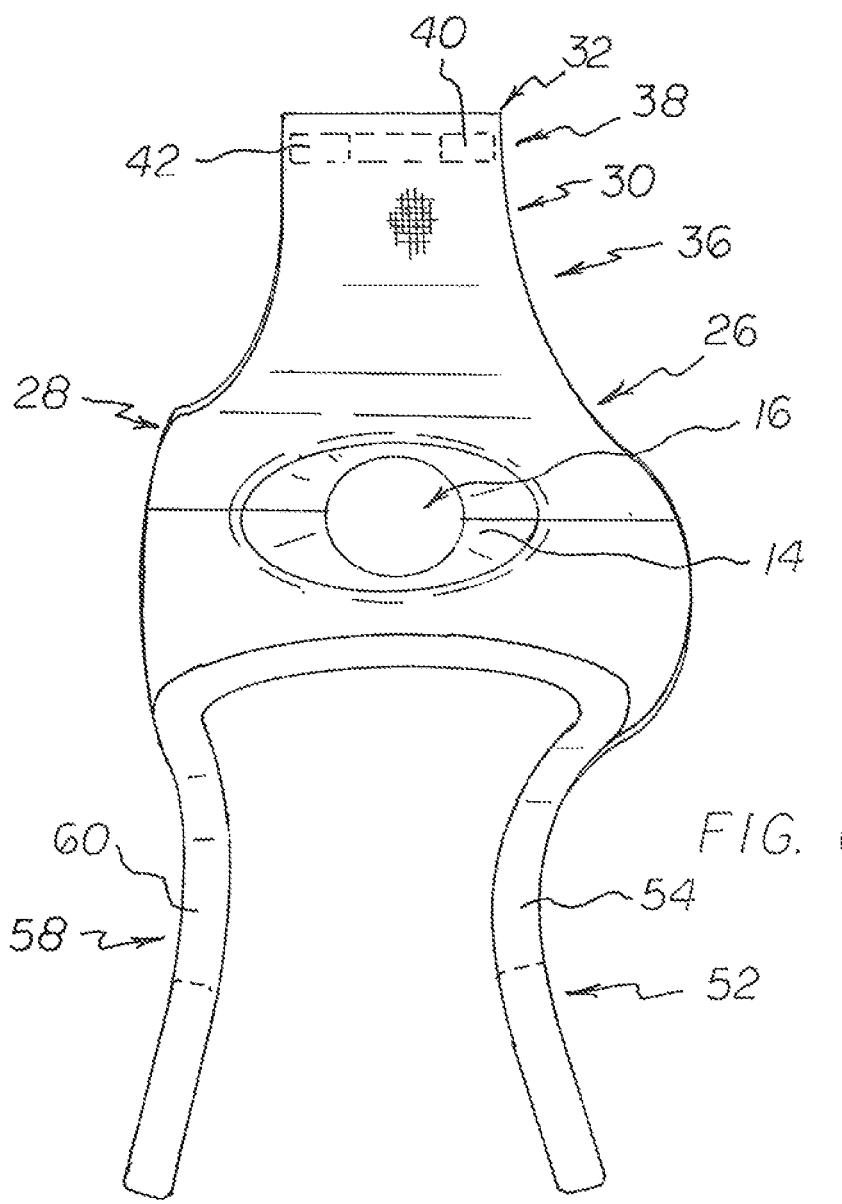

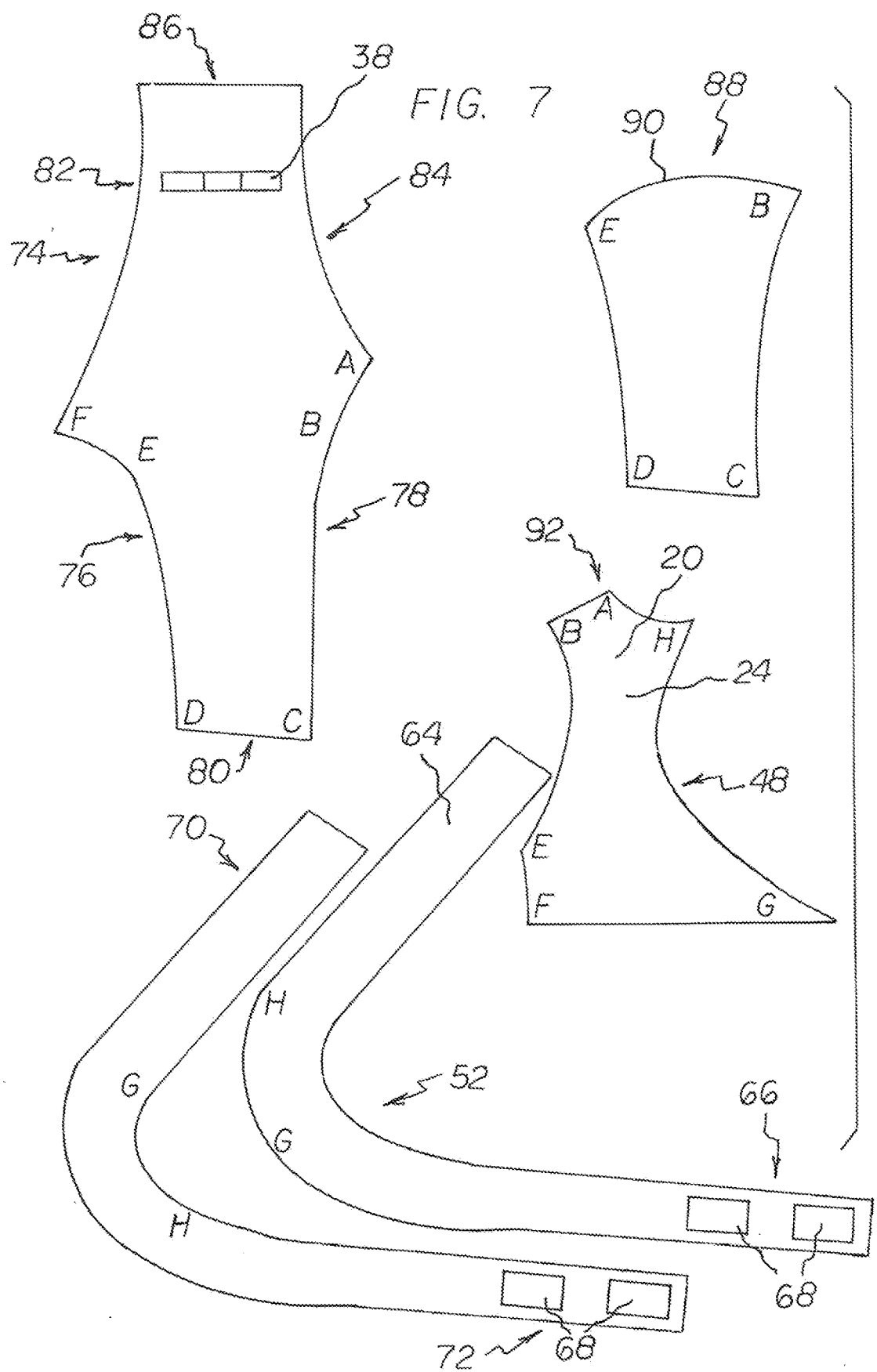

PET LEG PROTECTOR SLEEVE

BACKGROUND OF THE INVENTION

Rule 1.78 (F) (1) Disclosure

The Applicant has not submitted a related pending or patented non-provisional application within two months of the filing date of this present application. The invention is made by a single inventor, so there are no other inventors to be disclosed. This application is not under assignment to any other person or entity at this time.

There are no cross referenced or related applications which are direct to, or related to, the present application.

There is no research of development of this application which is federally sponsored.

FIELD OF THE INVENTION

The present invention relates to a Pet Leg Protector Sleeve and more particularly pertains to a covering for a pet's leg.

DESCRIPTION OF THE PRIOR ART

The use of pet leg covering devices is known in the prior art. More specifically, pet leg covering devices previously devised and utilized for the purpose of protecting a pet's leg are known to consist basically of familiar, expected, and obvious structural configurations, notwithstanding the number of designs encompassed by the prior art which has been developed for the fulfillment of countless objectives and requirements.

While the prior art devices fulfill their respective, particular objectives and requirements, the prior art does not describe Pet Leg Protector Sleeve that allows a covering for a pet's leg.

In this respect, the Pet Leg Protector Sleeve, according to the present invention, substantially departs from the conventional concepts and designs of the prior art, and in doing so provides a garment dressing which has been primarily developed for the purpose of providing a covering for a pet's leg.

Therefore, it can be appreciated that there exists a continuing need for a new and improved Pet Leg Protector Sleeve which can be used for a covering for a pet's leg. In this regard, the present invention substantially fulfills this need.

SUMMARY OF THE INVENTION

In view of the foregoing disadvantages inherent in the known types of pet leg covering devices now present in the prior art, the present invention provides an improved Pet Leg Protector Sleeve. As such, the general purpose of the present invention, which will be described subsequently in greater detail, is to provide a new and improved Pet Leg Protector Sleeve which has all the advantages of the prior art and none of the disadvantages.

In describing this invention, the word "coupled" is used. By "coupled" is meant that the article or structure referred to is joined, either directly, or indirectly, to another article or structure. By "indirectly joined" is meant that there may be an intervening article or structure imposed between the two articles which are "coupled". "Directly joined" means that the two articles or structures are in contact with one another or are essentially continuous with one another.

In describing aspects of the invention, the word "generally" may be used. The term, "generally" when used to describe a configuration means that the configuration includes those aspects which are within normal manufacturing parameters of acceptance. By way of example, the term "generally round" may be used. This should be interpreted to mean that the configuration may be perfectly round, but may also have a radius which is not exact, but is within the manufacturing parameters. For example, a basketball may be generally round, but not be perfectly round.

To attain this, the present invention essentially comprises a Pet Leg Protector Sleeve, comprising several components, in combination.

There is a hollow tubular lower portion which is fabricated of a flexible material, such as a cloth made of synthetic, natural, and blended material. The hollow tubular lower portion has a lower extent which comprises a circumferential opening. The circumferential opening allows a pet leg to pass through and out of the pet leg protector sleeve. The hollow tubular lower portion has a taper. The taper runs from the lower extent of the hollow tubular lower portion to a chest wrap portion of the pet leg protector sleeve.

The chest wrap portion of the pet leg protector sleeve is also fabricated of a flexible material, as described herein. The chest wrap portion of the pet leg protector sleeve has a lateral component and a median component. The lateral component of the pet leg protector sleeve has forward edge and a rearward edge, with a length there between. The lateral component of the pet leg protector sleeve has a top end, with the top end of the lateral component of the pet leg protector sleeve having a top edge.

The forward edge of the lateral component of the pet let protector sleeve has a curved lower portion and a curved upper portion. The top edge of the pet leg protector sleeve has an arcuate configuration. The top end of the pet leg protector sleeve has a pass through. The pass through of the top end of the pet leg protector sleeve comprising a pair of loops, being a forward loop and rearward loop which are fixedly coupled to the top end of the lateral component of the pet leg protector sleeve.

The median component of the pet leg protector sleeve has a front edge and a rear edge, with a length there between. The median component of the pet leg protector sleeve has a top end with a top edge. The median component of the pet leg protector sleeve has a forward strap having a length with an inner surface and an outer surface. The median component of the pet leg protector has a rearward strap having a length with an inner surface and an outer surface. The median component of the pet leg protector and the lateral component of the pet leg protector are operatively fixedly coupled to each other so as to be continuous with each other.

The forward strap of the median component of the pet leg protector sleeve has a proximal end which is continuous with the median component of the pet leg protector. The forward strap of the median component of the pet leg protector has a distal end, with the distal end of the forward strap of the median component of the pet leg protector sleeve having a co-acting removable attachment means located on the distal end outer surface of the forward strap of the median component of the pet leg protector. The distal end of the forward strap of the median component of the pet leg protector has a co-acting removable attachment means located on the inner surface of the distal end of the forward strap of the median component of the pet leg protector.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pet leg protector sleeve which has all of the advantages of the prior art pet leg covering devices and none of the disadvantages.

It is another object of the present invention to provide a new and improved pet leg protector sleeve which may be easily and efficiently manufactured and marketed.

It is further object of the present invention to provide a new and improved pet leg protector sleeve which is of durable and reliable constructions.

An even further object of the present invention is to provide a new and improved pet leg protector sleeve which is susceptible of a low cost of manufacture with regard to both materials and labor, and which accordingly is then susceptible of low prices of sale to the consuming public, thereby making such pet leg protector sleeve economically available to the buying public.

Even still another object of the present invention is to provide a pet leg protector sleeve for a covering for a pet's leg.

Lastly, it is an object of the present invention to provide a new and improved pet leg protector sleeve which comprises a hollow tubular lower portion. The hollow tubular lower portion has a taper running from a lower extent of the hollow tubular lower portion to a chest wrap portion of the pet leg protector sleeve. The chest wrap portion having a top having a pass through, with the pass through comprising a pair of loops, being a forward loop and rearward loop. There is a median component. There is a forward strap and a rearward strap which each has a co-acting removable attachment means located on a distal end outer surface of each strap.

It should be understood that while the above-stated objects are goals which are sought to be achieved, such objects should not be construed as limiting or diminishing the scope of the claims herein made.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a view taken along line 5-5 of FIG. 4.

FIG. 6 is top plan view of the pet leg protector sleeve, showing the forward and rearward straps passing through the pass through.

FIG. 7 is a plan view of the pieces which make up the Peg Leg Protector Sleeve, showing the lettered points of attachment of the several pieces.

The same reference numerals refer to the same parts throughout the various Figures.

DESCRIPTION OF THE PREFERRED EMBODIMENT

Figure 1:
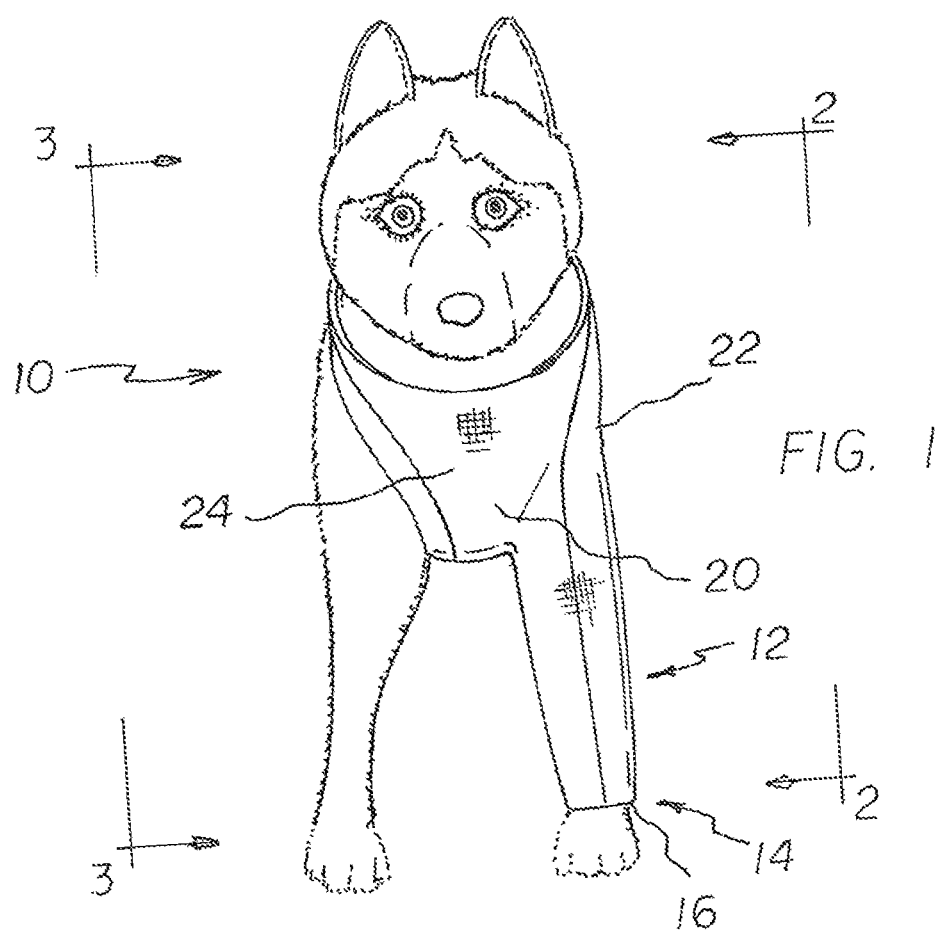
FIG. 1 is a front elevational view of the pet leg protector sleeve in place on a pet.
Figure 2:
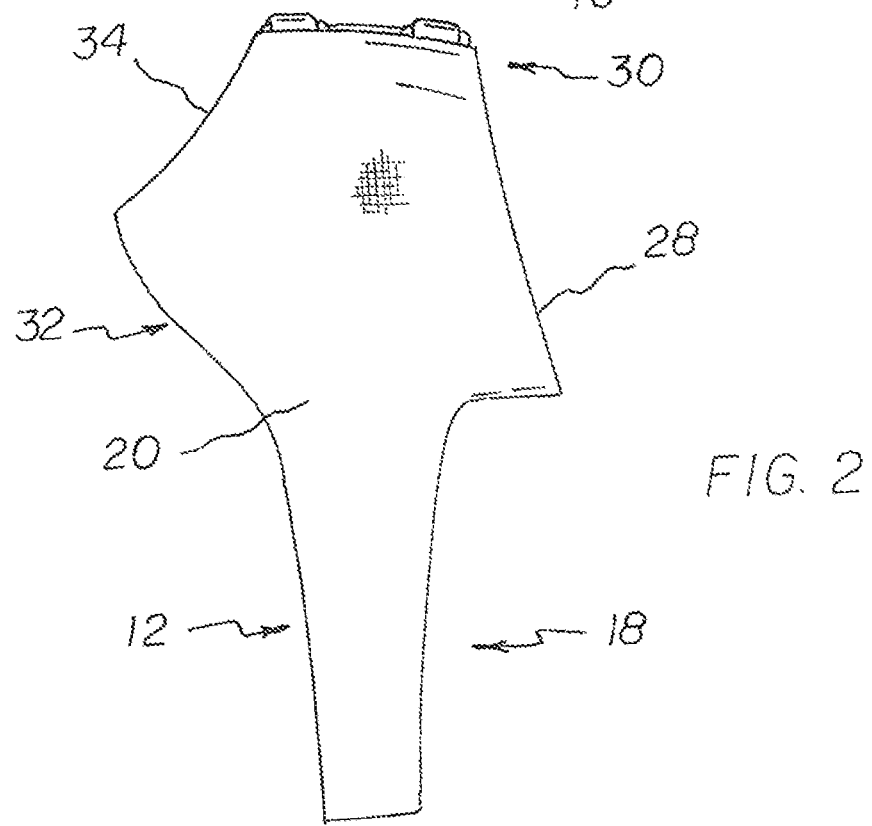
FIG. 2 is a view taken along line 2-2 of FIG. 1.
Figure 3:
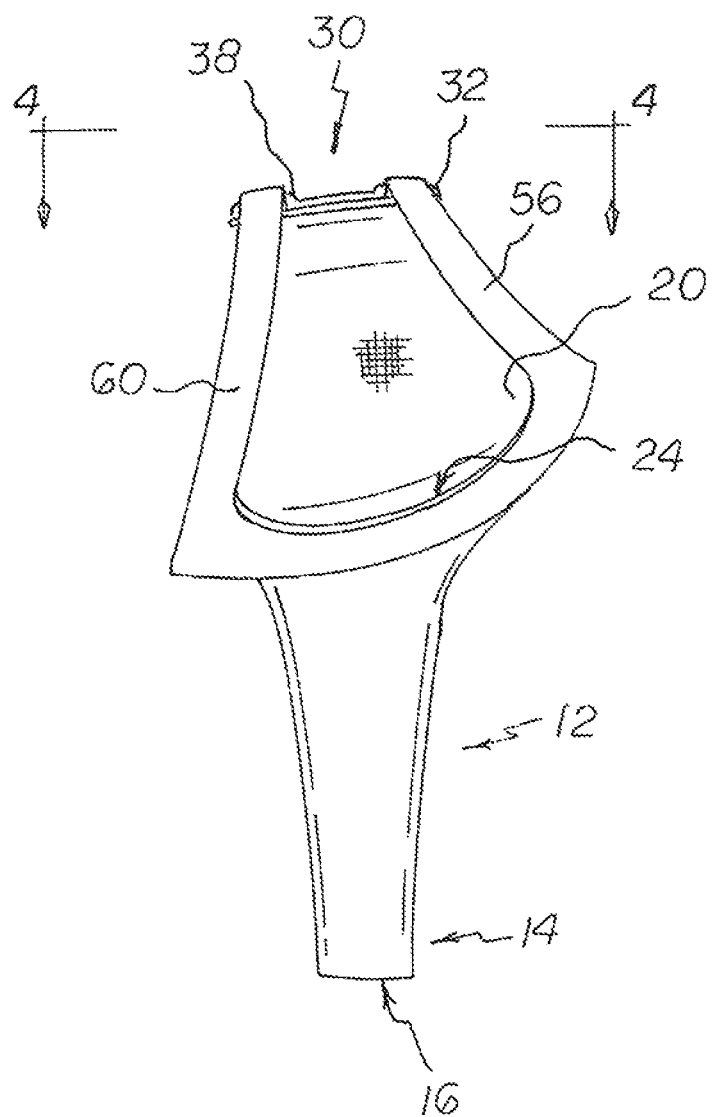
FIG. 3 is a view taken along line 3-3 of FIG. 1.
Figure 4:
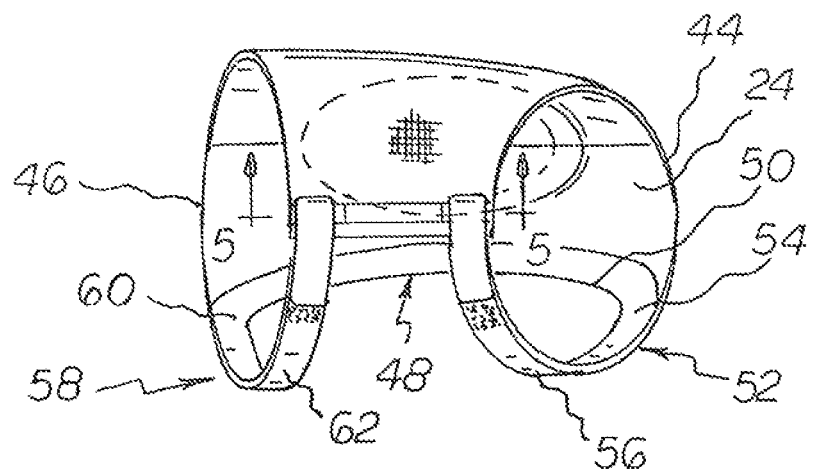
FIG. 4 is a view taken along line 4-4 of FIG. 3.

With reference now to the drawings, and in particular to FIG. 1 thereof, the preferred embodiment of the new and improved Pet Leg Protector Sleeve embodying the principles and concepts of the present invention and generally designated by the reference numeral 10 will be described.

The present invention, the Pet Leg Protector Sleeve 10 is comprised of a plurality of components. Such components in their broadest context include a hollow tubular portion, a chest wrap portion, a median component, a forward strap and a rearward strap. Such components are individually configured and correlated with respect to each other so as to attain the desired objective. Herein described is a pet leg protector sleeve, comprising several components, in combination.

There is a hollow tubular lower portion 12 which is fabricated of a woven material, such as a cloth made of synthetic, natural, and blended material. The hollow tubular lower portion has a lower extent 14 which comprises a circumferential opening 16. The circumferential opening allows a pet leg to pass through and out of the pet leg protector sleeve. The hollow tubular lower portion has a taper 18. The taper runs from the lower extent of the hollow tubular lower portion to a chest wrap portion 20 of the pet leg protector sleeve.

The chest wrap portion of the pet leg protector sleeve is also fabricated of the woven material, as described herein. The chest wrap portion of the pet leg protector sleeve has a lateral component 22 and a median component 24. The lateral component of the pet leg protector sleeve has forward edge 26 and a rearward edge 28, with a length there between. The lateral component of the pet leg protector sleeve has a top end 30, with the top end of the lateral component of the pet leg protector sleeve having a top edge.

The forward edge of the lateral component of the pet leg protector sleeve has a curved lower portion 32 and a curved upper portion 34. The top end of the pet leg protector sleeve has an arcuate configuration 36. The top end of the pet leg protector sleeve has a pass through 38. The pass through of the top end of the pet leg protector sleeve comprising a pair of loops, being a forward loop 40 and rearward loop 42 which are fixedly coupled to the top end of the lateral component of the pet leg protector sleeve.

The median component of the pet leg protector sleeve has a front edge 44 and a rear edge 46, with a length there between. The median component of the pet leg protector sleeve has a top end 48 with a top edge 50. The median component of the pet leg protector sleeve has a forward strap 52 having a length with an inner surface 54 and an outer surface 56. The median component of the pet leg protector has a rearward strap 58 having a length with an inner surface 60 and an outer surface 62. The median component of the pet leg protector and the lateral component of the pet leg protector are operatively fixedly coupled to each other so as to be continuous with each other.

The forward strap of the median component of the pet leg protector sleeve has a proximal end 64 which is continuous with the median component of the pet leg protector. The forward strap of the median component of the pet leg protector has a distal end 66, with the distal end of the forward strap of the median component of the pet leg protector sleeve having a co-acting removable attachment means 68 located on the distal end outer surface of the forward strap of the median component of the pet leg protector. An attachment means comprises at least one of the group of attachment means which includes, snaps, clips, hook/loop fasteners, ties, buckles, hooks, buttons, zippers and adhesives.

The rearward strap of the median component of the pet leg protector sleeve has a proximal end 70 which is continuous with the median component of the pet leg protector. The rearward strap of the median component of the pet leg protector has a distal end 72, with the distal end of the rearward strap of the median component of the pet leg protector sleeve having a co-acting removable attachment means 68 located on the distal end outer surface of the forward strap of the median component of the pet leg protector.

The pet leg protector sleeve, comprises several pieces, in combination. During fabrication, the pieces are first cut from a woven material, such as a fabric, which is comprised of a natural, synthetic, or blended material.

There is a first piece 74, being a leg and lateral piece, having a lower first edge 76 and a lower second edge 78 and a bottom edge 80, with the bottom edge being continuous with, and between the lower first edge and the lower second edge. The first piece, in part, forms part of the tapered sleeve which encases a pet's leg. The first piece also has an upper free edge 82, an upper neck edge 84, and a top edge 86. The top edge being between the upper free edge and the upper neck edge, the upper free edge being continuous with the lower first edge and the upper neck edge being continuous with the lower second edge. The top edge having the associated pass through strip, with the pass through strip having the pair of oppositely located pass throughs. The first piece has attachment points at specific locations, with the specific locations being labeled as A, B, C, D, E, and F, as shown in FIG. 7. The referred to attachment points are those points which are aligned with and attached to like-labeled attachment points, or attachment locations. For example, attachment point A would be coupled to any other attachment point A. If the pieces of the pet leg protector have a multiple of like labeled attachment points, this means that all the like labeled attachment points would be coupled to each other.

The second piece 88 is the inner leg piece, which has attachment points at specific locations, with the specific locations being labeled as B, C, D, and E. The second piece is coupled to the first piece to form the leg taper. The second piece and an arcuate upper edge 90

The third piece 92 is the front chest piece. The third piece has attachment points at specific locations, with the specific locations being labeled as A, B, E, F, G, and H. The third piece is coupled to the first piece and the second piece, and forms the median component.

There are a pair of attachment straps, being a forward strap and a rearward strap. The forward leg strap has attachment points at specific locations, with the specific locations being labeled as G and H.

The rearward leg strap has attachment points at specific locations, with the specific locations being labeled as G and H.

The pet leg protector sleeve comprises a first piece and a second piece and a third piece and a forward strap and a rearward strap.

The first piece being the leg and lateral piece having a pass through, the first piece having attachment points at specific locations. The first piece having a lower first edge having a downwardly and leftwardly curve labeled F and E and D, and a lower second edge having a downwardly and rightwardly curve labeled A and B and C, and a bottom straight edge labeled D and C. The first piece also having an upper free edge having an upwardly and leftwardly curve, and an upper neck edge having an upwardly and rightwardly curve, and a top edge which is generally straight. The top edge being between the upper free edge and the upper neck edge. The upper free edge being continuous with the lower first edge and the upper neck edge being continuous with the lower second edge. The top edge having the associated pass through strip, with the pass through strip having the pair of oppositely located pass throughs. The bottom edge being continuous with and between the lower first edge and the lower second edge. The first piece forming part of the tapered sleeve which encases a pet's leg, The second piece being the inner leg piece having a leftwardly and downwardly curve labeled E and D. The inner leg piece having a rightwardly and downwardly curve labeled B and C. The inner leg piece having a curve labeled E and B. The inner leg piece having a straight bottom edge labeled D and C.

The third piece being the front chest piece having a top straight edge labeled B and A and a top curved edge labeled A and H and a leftwardly curve labeled B and E. and a lower leftward straight edge labeled E and F, and a rightwardly curve labeled H and G and a straight bottom edge labeled F and G.

The forward leg strap having a rightward curve having attachment points at H and G.

The rearward leg strap having a rightward curve having attachment points at G and H. The forward leg strap and the rearward leg strap each having a distal end with the distal end of each of the straps having at least one attachment means coupled thereto.

The like labeled attachment locations are coupled together, resulting in the forming of the pet leg protector sleeve.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pet leg protector sleeve, comprising several pieces, in combination, the pet leg protector sleeve comprising:
    a first piece, being a lateral leg piece, having a lower first edge and a lower second edge and a bottom edge, with the bottom edge being continuous with, and between the lower first edge and the lower second edge, the first piece also having an upper free edge and an upper neck edge and a top edge, with the top edge being between the upper free edge and the upper neck edge, the upper free edge being continuous with the lower first edge and the upper neck edge being continuous with the lower second edge, the top edge having an associated pass through strip, with the pass through strip having a pair of oppositely located pass throughs;
    a second piece being a inner leg piece, having a first edge and a second edge and a lower edge and an arcuate upper edge, the second piece being coupled to the first piece to form a taper;
    a third piece being a front chest piece, having a bottom edge and a top edge and a neck edge and a free edge, the third piece being coupled to the first piece and the second piece;
    a pair of attachment straps being a forward strap and a rearward strap, each strap having a partially curved configuration with an attachment end and a free end, the free end of each strap having an attachment means coupled thereto, the pair of straps being coupled to the third piece;
    the first piece being the leg and lateral piece having a pass through, the first piece having attachment points at specific locations, the first piece having a lower first edge having a downwardly and leftwardly curve labeled F and E and D, and a lower second edge having a downwardly and rightwardly curve labeled A and B and C, and a bottom straight edge labeled D and C, the first piece also having an upper free edge having an upwardly and leftwardly curve, and an upper neck edge having an upwardly and rightwardly curve, and a top edge which is generally straight, the top edge being between the upper free edge and the upper neck edge, the upper free edge being continuous with the lower first edge and the upper neck edge being continuous with the lower second edge, with the top edge having the associated pass through strip, with the pass through strip having the pair of oppositely located pass throughs, with the bottom edge being continuous with and between the lower first edge and the lower second edge, the first piece forming part of the tapered sleeve which encases a pet's leg,
    the second piece being the inner leg piece having a leftwardly and downwardly curve labeled E and D, the inner leg piece having a rightwardly and downwardly curve labeled B and C, the inner leg piece having a curve labeled E and B, the inner leg piece having a straight bottom edge labeled D and C;
    the third piece being the front chest piece having a top straight edge labeled B and A and a top curved edge labeled A and H and a leftwardly curve labeled B and E, and a lower leftward straight edge labeled E and F, and a rightwardly curve labeled H and G and a straight bottom edge labeled F and G;
    the forward leg strap having a rightward curve having attachment points at H and G;
    the rearward leg strap having a rightward curve having attachment points at G and H, the forward leg strap and the rearward leg strap each having a distal end with the distal end of each of the straps having at least one attachment means coupled thereto; and
    the like labeled attachment locations are coupled together, resulting in the forming of the pet leg protector sleeve.

\* \* \* \* \*